July 4, 1967      A. J. WUSTNER      3,328,833
HINGE MECHANISM
Original Filed Oct. 7, 1964
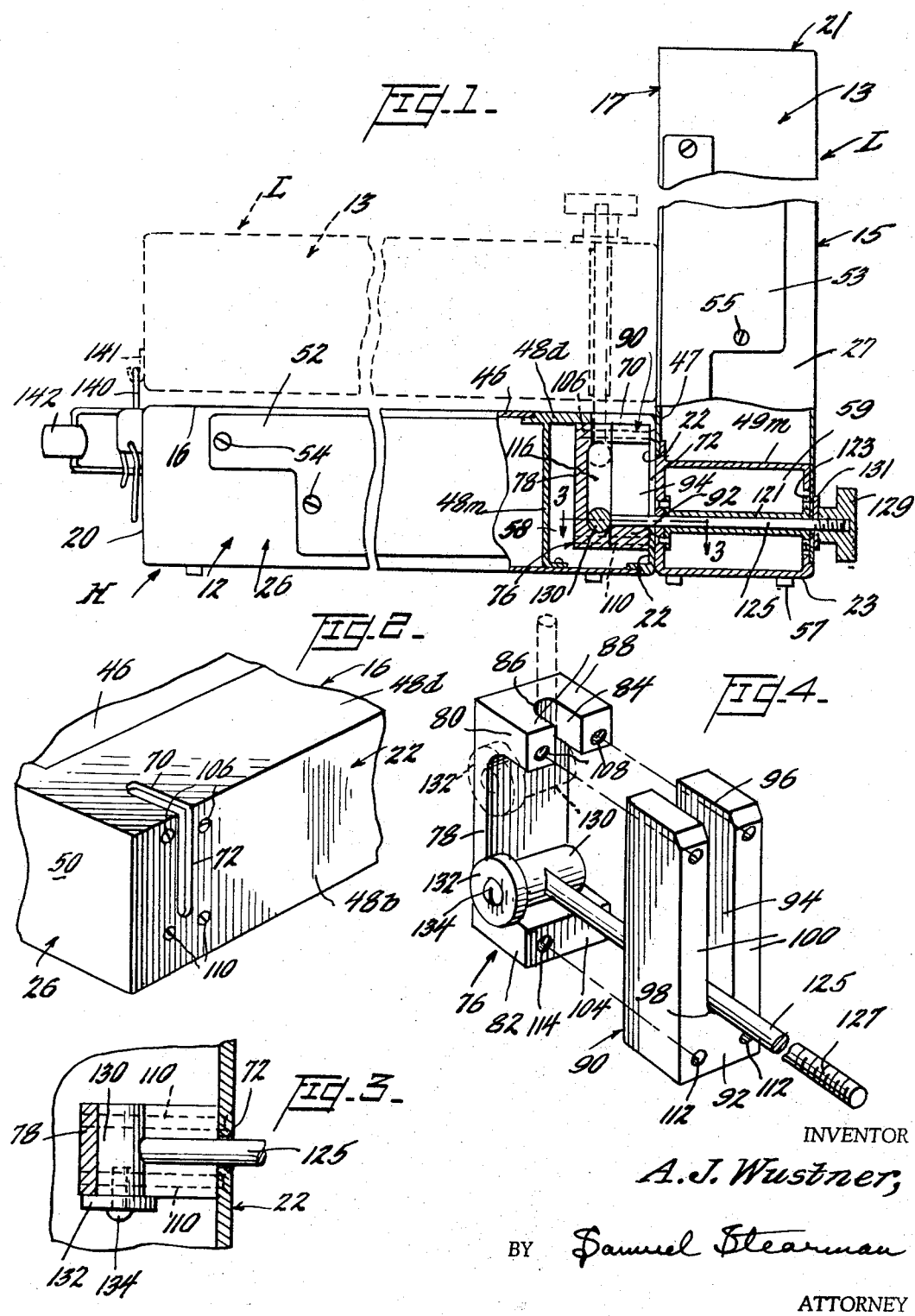
INVENTOR
A. J. Wustner,
BY Samuel Stearman
ATTORNEY

United States Patent Office 3,328,833
Patented July 4, 1967

3,328,833
HINGE MECHANISM
Alois Josef Wustner, 1109 Lombardy Road,
Silver Spring, Md. 20901
Original application Oct. 7, 1964, Ser. No. 402,069, now Patent No. 3,293,430. Divided and this application July 6, 1966, Ser. No. 563,132
3 Claims. (Cl. 16—179)

This application is a division of my co-pending application, Ser. No. 402,069, filed Oct. 7, 1964, now Patent No. 3,293,430.

The present invention relates to a hinge mechanism and is particularly concerned with the provision of a hinge mechanism for use in connection with a pair of housings or containers of parallelopiped form.

The principal object of the invention is to provide a hinge mechanism for use as aforesaid, and which is so constructed as to enable one parallelopiped form of housing or container to be hingedly connected with a container or housing of like parallelopiped form, and which is constructed so as to serve, selectively, (a) for retaining the two containers or housings rigidly in their respective positions when one of them is disposed so as to extend at a right angle with respect to the position of the other (i.e., similar to the position of the body and closure members of a suitcase when the latter is fully opened); (b) for retaining the two containers or housings firmly in a closed position, i.e., in face-to-face position relative to one another (i.e., similar to the positions of the body and closure members of a suitcase when the latter is closed) for portably, i.e. manually, moving the entire structure or unit from one place to another; and (c) for enabling one of the housings or containers to be readily connected to or disconnected from the other.

The hinge mechanism of the invention has been found to be of particular utility as a means for hingedly connecting to one another the component housings of a hand-portable seriograph apparatus constructed as described in my aforesaid co-pending application. The disclosure in said co-pending application is accordingly incorporated herein by reference.

Briefly described, however, the seriograph apparatus disclosed in the aforesaid co-pending application comprises a pair of parallelopiped or box-shaped housings connected to one another adjacent one of their corresponding side walls for swingable movement of one of the housings relative to the other thereof, through an angle of ninety degrees. The aforesaid connection of the housings to one another comprises the hinge mechanism of the present application. Each of the housings has an opening in one of its end walls for inserting a plurality of cassette holders into and withdrawing the same seriatum from the respective housings, and each housing is also formed in thew all confronting a wall of the other housing, with an opening to permit exposure of X-ray film carried by the cassettes in the cassette holders inserted into the respective housings. Thus, and as set forth in greater detail in the aforesaid co-pending application, the apparatus may be utilized for seriography, such as for obtaining lateral and anterior-posterior angiographs.

The hinge mechanism of my invention is constructed and arranged so as to serve, as above stated, (a) for selectively retaining the housing rigidly in position when one of them is swung upwardly from the position it occupies when the apparatus is closed and through an angle of ninety degrees so as to be positioned at a right angle to the other housing when the apparatus is opened, as for use in seriography; or (b) for retaining the housings firmly together in face-to-face relation when the apparatus is closed; and (c) for enabling the ready connection and disconnection of one housing to the other.

The invention will be more clearly understood from the more detailed description set forth below and from the accompanying drawing, in which:

FIG. 1 is a view, partly in outline and partly in cross-section, showing the construction of the hinge mechanism embodying the invention, as installed and utilized in the seriograph apparatus hereinabove referred to;

FIG. 2 is a fragmentary perspective view showing a portion of one of the components of the seriograph apparatus;

FIG. 3 is an enlarged fragmentary view, partly in plan and partly in cross-section, taken along line 3—3 of FIG. 1; and FIG. 4 is an exploded detail view in perspective, illustrating the hinge construction.

Referring more in detail to the drawing, the hinge mechanism of the invention is depicted therein for use in hingedly connecting components L and H of a seriograph unit or apparatus, so as to enable one of the components, namely, component L, to be swung upwardly from the position it occupies relative to component H when the apparatus is closed and not in use or is being moved or transported. The other component H, to which component L is hinged as aforesaid, occupies a horizontal position when the unit is in use. In the latter position, component L extends upwardly at a right angle with respect to component H. In the closed position of the components when the unit is not in use, component L occupies the position, relative to component H, shown in dotted outline in FIG. 1.

When the unit is in use, i.e., with the component L disposed so as to extend vertically upward at a right angle with respect to component H, the latter component serves for anterior-posterior serial angiography, and component L serves for lateral serial angiography.

Component H comprises a housing 12 of generally rectangular parallelopiped form having a bottom wall 14, a top wall 16, side walls 20, 22, and end walls 26.

Component L comprises a housing 13 likewise of generally parallelopiped form, having an outer or back wall 15, an inner or front wall 17, side walls 21, 23, and end walls 27.

Housing 12 along the margin adjacent its longitudinal side wall 22, and housing 13, along the margin adjacent its side wall 23, are arranged, as hereinafter more fully set forth, to permit installation and operation of the hinge mechanism of the invention, for swinging component L upwardly from the dotted line position it occupies as shown in FIG. 1, to the vertical position (shown in full lines in FIG. 1) in which it extends upwardly at a right angle with respect to component H.

In accordance with this feature of the invention, the hinge mechanism is constructed to enable the same to be disposed interiorly of the unit, as hereinafter more fully described, and to assure not only easy movement of component L with respect to component H, but also to serve for selectively maintaining components H and L in proper and rigid relationship to one another in the closed position of component L relative to component H as shown in dotted outline in FIG. 1, as well as in the open position thereof as shown in FIG. 1 when the unit is in use, or for permitting easy and rapid connection and disconnection of the components L and H to and from one another.

To the foregoing ends, and referring particularly to FIGS. 1 and 4, the compartment 58 formed between wall portion 48m and side wall 22 of housing 12, and the compartment 59 formed between wall portion 49m and side wall 23 of housing 13 serve to support the elements of the hinge mechanism, as will now be more fully described.

As will be seen, particularly from FIG. 2, the wall portion 48d of the top wall 16 of housing 12 is formed with a slot 70 adjacent and parallel to each of the respective end walls 26 of the housing. The slots 70 each extend inwardly of the wall portion 48d a substantial distance, the open end of each slot connecting with the open end of a slot 72 extending a substantial distance inwardly from the junction of wall portion 48d with the wall portion 48b constituting the side wall 22 of the housing, each of the slots 72 likewise being disposed adjacent and parallel to the end walls 26 of the housing.

As particularly illustrated in FIGS. 1 and 4, a U-shaped guide member 76 is mounted within compartment 58, adjacent each of the end walls 26, so as to be disposed therein with its back or bridging wall 78 spaced from and parallel to wall portion 48b, its leg 80 disposed with its outer surface closely adjacent the inner surface of wall portion 48d of the housing, and its other leg 82 disposed in spaced relation to the interior surface of the bottom wall 14 of the housing. As shown in FIG. 4, the leg 80 is bifurcated by a central slot 84 extending inwardly from the outer end of the leg and terminating in a rounded inner end 86.

Member 76 may desirably be about 2.75 inches in height, about 0.75 inch in width, and about one inch in depth. The legs 80, 82 are each formed with the inner surface thereof joined to the inner surface of portion 78 along a semi-circle of approximately 0.5 inch diameter, for a purpose to be hereinafter set forth. The distance between the flat portions of the inner surfaces of the legs may desirably be about 1.75 inches.

Fitted into each end of compartment 58, in the space between member 76 and side wall 22, is a second guide member 90, the latter comprising a bifurcated element of substantially the same height and depth as member 76, but preferably of somewhat greater width than the latter. Member 90 is composed of a base portion 92 at the lower end thereof, and a centrally disposed, relatively elongated slot 94 extending vertically from the base portion and throughout the width of the element, to the upper end edge 96 thereof. Slot 94 is of substantially the same depth or transverse dimension as that of slot 84 in member 76, and is formed with a rounded surface 98 at the lower end thereof joining the inner surface of legs 100.

Members 90, as above indicated, are positioned adjacent each end of compartment 58, between members 76 and the side wall 22 of the compartment. Legs 100 are each of substantially the same thickness as that of legs 88 formed by the slot 84 of the member 76. The position of each member 90 in compartment 58 is such that the inwardly facing edges of legs 100 are substantially in surface contact, at the upper ends thereof, with the outwardly facing edges of legs 88, and the inwardly facing vertical surface of base 92 is likewise substantially in surface contact with the outwardly facing edge 104 of leg 82 constituting the base of the member 76. Thus, a raceway 116, open at its sides and closed at its upper and lower ends is formed between members 76, 90.

Members 76 and 90 are secured in compartment 58 so that slots 84, 94 of the members 76, 90 are disposed with their axes in transverse alignment with one another and with that of slots 70, 72 formed in the horizontally extending wall portions 48d and the vertically extending side walls 22 of housing 12, respectively. Such securement of the members 76, 90 in the aforesaid positions may be obtained in any desired manner, preferably by means of screw bolts 106 extending through openings formed adjacent the upper end of the sidewall 22 of the housing and on each side of the slot 72 therein, and passing through openings which extend through legs 100 adjacent the upper end thereof and to engage threaded openings 108 extending into the ends of legs 88 of the members 76, and similar bolts 110 extending through openings formed adjacent the lower end of side wall 22 and passing through openings 112 which extend through the base 92 of member 90 and to engage threaded openings 114 extending into leg 82 of the members 76.

Mounted within compartment 59 of housing 13 are the other elements of the hinge mechanism. These comprise cylindrical sleeves 121, each fixed adjacent one end of compartment 59 as by means of a flange 123 at each end of the sleeve, and having several openings therein, through which flat head screws may be inserted through registering openings in the back wall 15 and in wall portion 49d of housing 13.

Extending through each sleeve 121 for slidable movement therein is a hinge rod 125 threaded at its outer end as indicated at 127, and joined at its opposite end, as by welding the same, to pivot head 130 approximately midway of the longitudinal axis of the latter and in a position such that the longitudinal axis of the rod 125 extends at a right angle to the longitudinal axis of the pivot head. As will be noted, the latter is thus confined within raceway 116.

The rods 125 are each of approximately 0.25 inch diameter, which latter is slightly less than that of the bore of the sleeves 121, in order to permit sliding of the rods in their respective sleeves. The diameter of rods 125 is also less than the transverse dimension of slots 84, 94 in members 76, 90, in order to permit the rods to move freely therethrough, as described herebelow.

In their assembled position, the above-described elements of each hinge mechanism occupy the positions within the respective compartments 58, 59 as more clearly shown in full lines in FIG. 1 when the unit has been set in place and opened for use, i.e., with component L extending upwardly at a right angle with respect to component H. The components are held firmly and, in effect, locked in that position by means of the hinge mechanism. In that position, an internally threaded knob 129 engages the threaded outer end of each of the horizontally disposed rods 125 projecting a short distance outwardly beyond the outer surface of the back wall 15 of housing 13. Preferably, a circular spacer 131, of phenolic or other suitable resin material is interposed on each of the rods 125, between the outer surface of back wall 15 and the inner end of each knob 129, to serve as a bearing surface for the knob.

As will be noted from FIG. 1, when the rods 125 are in the above-described position, the pivot heads 130 are each seated in the rounded (quarter-circular) surface at the junction between portion 78 and leg 82 of member 76. Desirably, in order to assist in retention of the pivot heads in their operating position, a flat washer 132 of nylon, Teflon or like material may be fastened to either of the outer end faces of each pivot head, as by means of a screw 134 passing through the washer and engaging a threaded tap formed at the corresponding end of pivot head. The washers 132 are of an outside diameter in excess of the width of raceways 116 so as to prevent rotary movement of the rods 125.

When it is desired to return component L from its open, i.e., its vertically extending position, in which it is held by the hinge mechanism when the apparatus is in use, to the horizontally extending position, as shown in dotted outline in FIG. 1, this may be done simply by loosening each of knobs 129 sufficiently to permit lifting component L a short distance above the table and then turning component L downwardly toward top wall 16 of component H. As will be apparent, when component L is thus lifted, the pivot heads 130 will be carried upwardly in their respective raceways 116 until they come to rest at the respective upper ends thereof as the rods 125 fixed to the pivot heads and portions 78 of members 76, and rods 125, are carried upwardly along slots 72 in side wall 22 and along slots 94 in members 90. As component L is turned over toward top wall 16 of component H, the inner end of hinge rod 125 swings over through slots 70 in the top wall 48d of housing 12, and their aligned slots 94 in members 90 and 84 in member 76, until the rods reach the vertical position (shown in dotted outline in FIG. 1), namely when component L has been brought down to a horizontal position surmounting component H. In that position of the elements of the hinge mechanism, they serve to hold component L in the closed position relative to component H. The components H and L may be firmly held in that relative position by then tightening down the knobs 129 on the threaded outer ends of the rods 125.

As a precaution against separation of components L and H from one another at the side thereof opposite their hinged sides, when they are in the closed position shown in FIG. 1, any conventional form of latching means may be utilized. As illustrative thereof, freely swinging loops 140 mounted on the exterior of side wall 20 of component H and cooperating with hooks or catches 141 mounted on the exterior of side wall 21 of component L, may be employed.

In order to facilitate carrying the apparatus by hand, any conventional form of handle means, such as shown at 142, may be attached along the mid-portion of the exterior of side wall 20 of component H.

What I claim is:

1. A hinge mechanism especially adapted for connecting one housing of parallelopiped form to another housing of like form for swingable movement of one of said housings with respect to the other thereof through an angle of ninety degrees, said mechanism comprising:
 (A) a U-shaped member having one of its legs centrally bifurcated and having a rounded surface at the junction of its other leg with the base of the U, the axis of said rounded surface extending substantially at a right angle to the axis of the bifurcation in said first-named leg the base of the U being substantially longer than the legs of the U;
 (B) a separate, centrally bifurcated member, to provide said member with a pair of legs each of a thickness substantially equal to the thickness of the legs of said U-shaped member;
 (C) a hinge rod having a pivot head affixed to one end thereof and adapted to be disposed in said rounded surface with its axis lying along the axis of the rounded surface;
 (D) a hollow, cylindrical sleeve for encircling said rod; and
 (E) means for securing said two first-named members together when disposed with the ends of the legs of the first-named member in abutment with the confronting end surfaces of the base and legs of the second-named member, whereby to form an elongated raceway for said pivoted head.

2. A hinge mechanism as defined in claim 1, wherein said sleeve is provided with a flange at each end thereof for securing the ends of the sleeve to opposite walls of one of the housings.

3. A hinge mechanism as defined in claim 1, wherein said rod is threaded at the end thereof opposite said pivot head and is provided with an internally threaded knob for engagement with said threaded end of the rod, the inner end of said knob being formed to engage the outer surface of the one of said opposite walls of said housing which is the more remote from said pivot head.

References Cited

UNITED STATES PATENTS

| | | | |
|---|---|---|---|
| 1,793,946 | 2/1931 | McEwan | 16—179 |
| 2,762,076 | 9/1956 | Kiba | 16—176 |

MARVIN A. CHAMPION, *Primary Examiner.*

D. L. TROUTMAN, *Assistant Examiner.*